Figure 3:
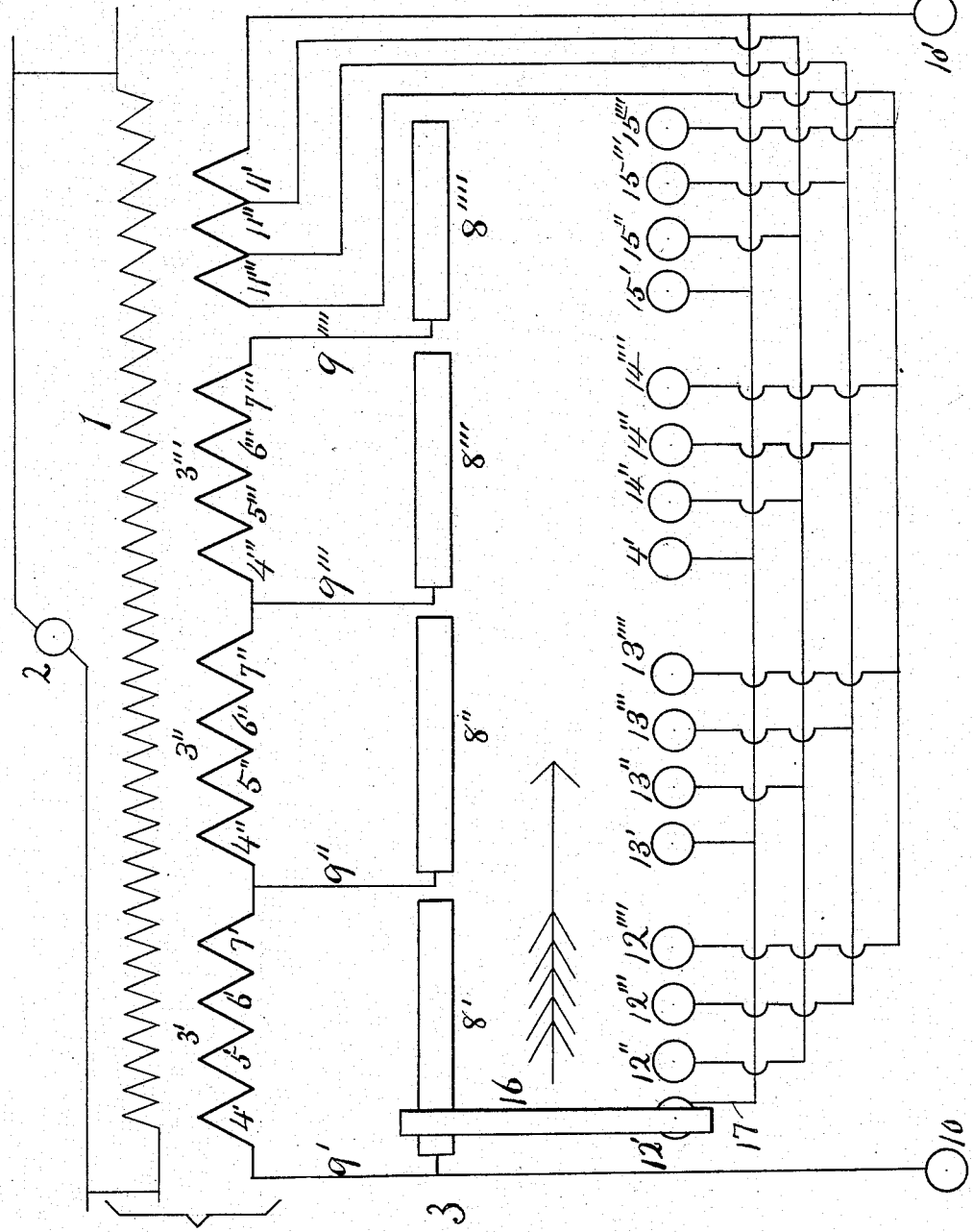

No. 673,567. Patented May 7, 1901.
L. M. PIGNOLET.
ELECTRIC TRANSFORMER.
(Application filed Sept. 10, 1898.)
(No Model.) 2 Sheets—Sheet 1.
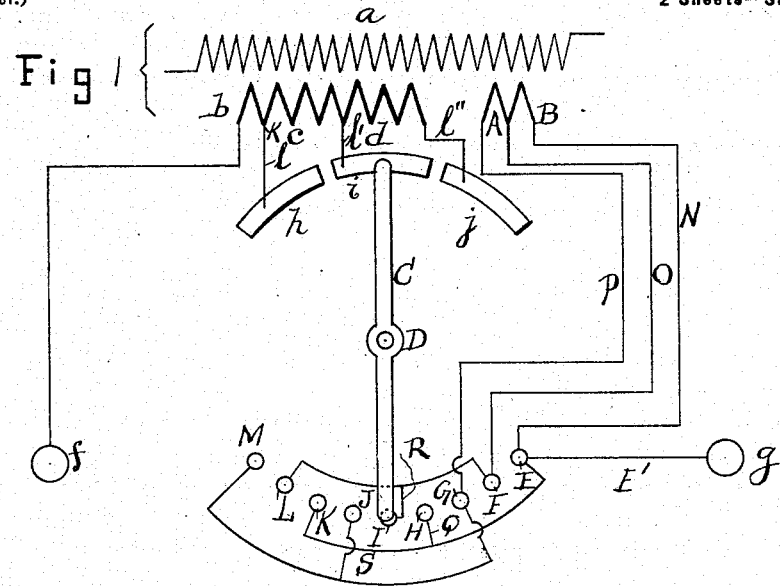
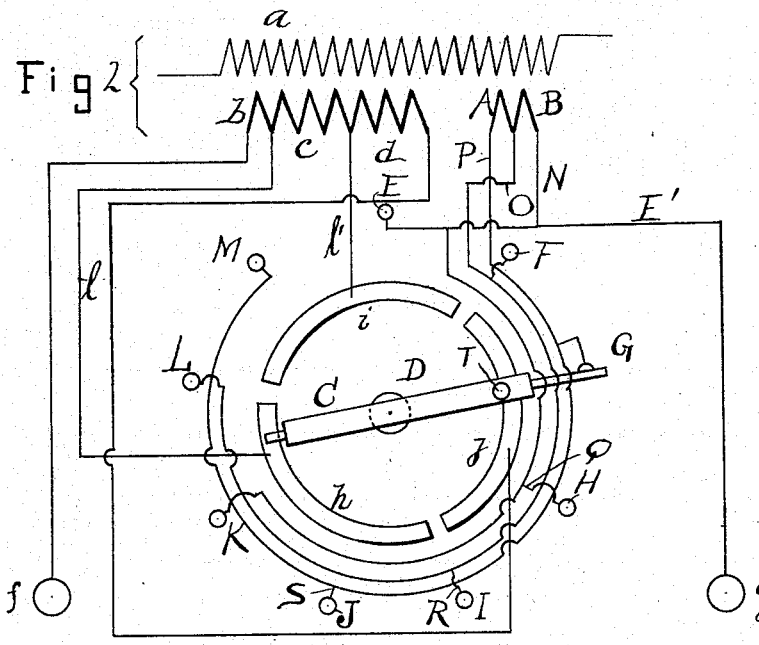
WITNESSES: J. E. Coleman, Morris Myers
INVENTOR L. M. Pignolet
BY Edward P. Thompson
ATTORNEY
THE NORRIS PETERS CO., PHOTO-LITHO., WASHINGTON, D. C.

No. 673,567. Patented May 7, 1901.
L. M. PIGNOLET.
ELECTRIC TRANSFORMER.
(Application filed Sept. 10, 1898.)
(No Model.) 2 Sheets—Sheet 2.

WITNESSES:
J. E. Coleman
Morris Meyers

INVENTOR
Louis M. Pignolet
BY
Edward P. Thompson
ATTORNEY

UNITED STATES PATENT OFFICE.

LOUIS M. PIGNOLET, OF ORANGE, NEW JERSEY.

ELECTRIC TRANSFORMER.

SPECIFICATION forming part of Letters Patent No. 673,567, dated May 7, 1901.

Application filed September 10, 1898. Serial No. 690,640. (No model.)

*To all whom it may concern:*

Be it known that I, LOUIS M. PIGNOLET, a citizen of the United States of America, and a resident of Orange, in the county of Essex and State of New Jersey, have invented certain new and useful Improvements in an Electric-Transformer Regulator, of which the following is a specification.

My invention relates to an electric transformer and its adjuncts, all so constructed that by the movement of a switch manually a single coil at a time or two or more coils at a time are cut into or cut out of circuit of the secondary element of the transformer, and yet all this is accomplished with but a comparatively few connections with the coils themselves.

The object of the invention is to remove the difficulty, to a great extent, of soldering or otherwise making electrical connection between the wire of the secondary coils and the wires leading to any given switch for regulating the number of secondary convolutions in or out of circuit. Usually to cut in one coil at a time in a secondary having, say, fifteen coils would require about thirteen joints between the wires of the coils and the wires that go to the switch, whereas with my invention I would require only four joints and yet be able to secure the same results.

In order to carry out my invention, I provide the usual primary and secondary coils constituting the transformer. The secondary is divided into sections or groups of coils, each group containing as many coils as the other, although this is not absolutely essential, for there may be one coil by itself to be used as the first coil and to be thrown into circuit when it is desired to have a transformer that will give a very small voltage at the beginning of the current. I provide also a certain number of extra secondary coils, or coils that are for the purpose of carrying out my conception of reducing the number of joints. The number of extra coils is one less than the number of coils in any one of the groups into which the secondary coil is subdivided. For example, if the group has four coils the number of extra coils is three. The groups of coils are all connected consecutively in series with one another; but the extra coils are not electrically connected to the other coils, which are in groups, although they are connected to each other in series consecutively, reference being had in both cases to the omission of the switch, which serves to vary the connections in a variety of ways in the following style: The groups of coils which may be called the "principal" or "main" coils are accompanied by a set of contact-bars for the switch to move over while in contact with them. These contacts are respectively connected to the respective groups of main coils, so that if there are eight groups there are nine contacts. The extra coils are accompanied by groups of contacts, and in each group there are several contacts, but always one more than the number of extra coils, and the number of contacts in each group is one greater than the number of extra coils. A switch connects the contacts that are provided for the groups of main coils with the contacts that are provided for the extra coils. As the switch moves from one main-coil contact to the other and along the main-coil contacts it includes into the circuit, first, a certain minimum number of main or extra coils, and then successively a single coil at a time, if the graduation is to be so small, or any given small number of coils, so that the regulation may be as gradual as could ever be desired in practice.

In commerce I employ this invention for regulating the heat electrically applied to a pair of surgical forceps and for certain other purposes where regulation is desired and yet where the objection arises to the great number of joints, as above pointed out.

Figure 1 is a diagram of an electrical transformer and of the means for regulating the number of secondary coils in circuit with the terminals of the device. The diagram illustrates also the principle of mechanical construction. Fig. 2 shows substantially the same thing, with the important exception that the mechanical construction is such that the instrument is much more compact, a very desirable feature in regulating devices. Fig. 2ª is a partial side elevation of that in Fig. 2. Fig. 3 shows in diagram a modification and serves to illustrate the general principle underlying the method of electrically connecting up the coils and contacts, howsoever large or small may be the number of coils in the secondary.

Referring to Fig. 1, $a$ is the primary coil of an electric transformer. $b$ is a single coil of the secondary coils of the same transformer. $c$ represents a group of three coils of the secondary of said transformer. $d$ is a second group in series circuit with the coils $b$ and $c$, and $f$ is the terminal of the coil $b$ and forms the terminal of the secondary of the transformer, whose purpose, as represented, is to reduce the electromotive force. $g$ is the other terminal of the secondary coils of the transformer. The other terminal of the coil $b$ is connected to the first of a row of contacts $h$, $i$, and $j$. The joint $k$ is the one between the wire $l$ and the common terminal between the coil $b$ and the coils $c$. The wire $l$ connects said joint to the contact $h$. $l'$ is a wire that joins the terminals of the coils $c$ and $d$ to the next contact $i$. $l''$ is the wire that joins the contact $j$ to the common terminal of the coils $d$. A and B are single coils acting as secondary coils to the same primary coil $a$, but are not in series nor connected otherwise to the secondary coils $b$, $c$, and $d$ except by means of a certain switch under certain circumstances. C is a switch which is pivoted at its center at D. One end moves over and in contact with the contacts $h$, $i$, and $j$. The other end moves over and in contact with three times as many contacts E, F, G, H, I, J, K, L, and M, arranged in the path of the said switch. When one end of the switch C is in contact with the contact $h$, the other end may be in contact with any one of the three contacts E, F, or G. While the switch C is in contact with the next contact, $i$, the other end may be in contact with any one of the contacts H, I, or J. Also when the contact $j$ is in contact with the switch C the latter is in contact with one of the contacts K, L, or M. The three contacts E, F, and G are connected, respectively, by the conductors N O P with the terminals of the coils A and B. The contacts H, I, and J are likewise connected with the terminals of the coils A and B through the conductors in order Q N and R O and S P. The terminal E is connected to the terminal $g$ of the whole device.

The operation and results, in view of the above construction and electrical connections, are as follows: When the switch C moves over the successive contacts E F G, &c., there is in circuit between the terminals $f$ and $g$ first one coil of the secondary, then two coils, and then three, then four, and so on up to the maximum number. This will become apparent by tracing the currents. Let the switch C touch the contact $h$, so that one end is on the first terminal contact E. The continuous circuit through the apparatus is therefore from the terminal $f$ to one end of the coil $b$, through the said coil to the joint $k$, through the wire $l$ to the contact $h$, to and through the switch C to the contact E, through the conductor E', and finally to the terminal $g$, and as a consequence there is but one coil of the secondary in circuit with the terminals $f$ and $g$ of the regulating instrument. When the switch C comes to rest upon the contact F, the circuit is from the terminal $f$ to the coil $b$, to the contact $h$, through the switch C to the contact F, through the conductor O to the coil A, through the conductor N to the terminal $g$, and hence there are two coils of the secondary in circuit between the terminals of the instrument. One of the coils is a main coil $b$, and the other is one of the extra coils, B. They are in series with each other, so that the electromotive force of the current is increased over what it was when but the coil $b$ was in circuit. When the switch moves on and comes into contact with the next contact, G, the circuit is from the contact or terminal $f$, through the coil $b$, through the switch C to the contact G, through the conductor P, through the coil A and coil B, through the conductor N, and finally to the terminal $g$. Three coils are therefore in circuit. When the switch moves on and comes into contact with the contact H, it has passed to the contact $i$. In view of the connections already described there are four secondary coils in circuit—namely, the coil $b$ and the group of coils $c$. I could also show that as the switch C moved farther and farther to the remaining contacts there would be in circuit first five, then six, then seven, then eight, and then nine; but as the connections are all shown and as several circuits have been traced by reference-letters it is thought unnecessary to trace any more circuits for different positions of the switch C.

By counting the number of joints that have to be made between the end joints, which cannot properly be called joints because merely continuations of the wires of the coils, it will be noticed that there are but three joints—namely, at $k$, at the end of the wire $l'$, and at the end of the wire O—and yet I am able by such a few joints to throw into circuit first one coil, then two, then three, then four, and so on all the way up to ten coils.

Fig. 2 shows especially how the construction may be made more compact by having the contacts $h$ $i$ $j$ and the other contacts considered as a different set E F G H, &c., arranged concentrically to each other. The circle T is a handle for turning the switch C. Otherwise the construction is the same as described by reference to Fig. 1, except that some of the wires are longer or shorter or extending in different directions; but no further description is necessary to those versed in the art.

Fig. 2ª shows how the switch C bridges the contact $j$ without touching it.

I have thus far described only the actual construction and electrical connections of apparatus for carrying out the invention; but I have not set forth the general principles of construction so that any one versed in the art could design instruments of different capacity and degrees of regulation. However, by understanding my description of Fig. 3 in addition to the information regarding Figs. 1 and 2 I believe that any one may design the device to suit any use—as, for example, either for regulation of small currents or for large electric light and power plants. At the same time Fig. 3 illustrates a modification where the first group into which the secondary coil is subdivided is not a single coil, but four coils.

I will use reference-numerals, as they will make the description seem more systematic.

1 represents a primary coil in circuit with the alternator 2 for sending an inducing-current through said coil. The main coil of the secondary is divided into two general sets—the main coils and the extra coils. The main coil is divided into groups which are in series with one another, and the number of coils in each group may be chosen at random or according to the total number of coils in the secondary or according to the degree of gradual regulation to be effected; but in all cases the number of coils in each group should be equal. In the case in hand the groups are three in number and there are four coils in each group. The first group is indicated by 3', the second by 3", and the third by 3'". The individual coils of each group are numbered in the first group 4' 5' 6' 7', in the second group 4", 5", 6", and 7", and in the third group 4'" 5'" 6'" 7'". As there are three groups there is that number, plus one, of contacts, which are numbered 8', 8", 8'", and 8''''. This is always the case, as there should be one more contact provided than there are groups. There may be, but not necessarily so, an exception, as illustrated, for example, in Figs. 1 and 2. Here there are three groups $b$, $c$, and $d$, and yet there are but three contacts $h i j$. The exception occurs when there is but one coil $b$ in the first group, and therefore the current has the voltage at the beginning of only one volt, if each coil represents a volt; but usually about four coils should be the minimum number of coils in the secondary group 3', and then, as hereinafter explained, the first coil which is in circuit is one of the extra coils. An engineer will understand when it is necessary to have one more contact than groups. Having marked off the groups of coils 3' 3" 3'", the constructor should solder a wire 9" to the wire of the secondary between the first and second groups 3' and 3" and lead it to and electrically connect it to the second contact 8". The next wire 9'" should join the secondary between the second coil 3" and the third coil 3'" to the third contact 8'". One end of the secondary considered as a whole or one terminal of the group 3' should be connected by the wire 9' to the first contact 8' and also to the terminal of the whole apparatus at 10. The other end of the secondary considered as a whole or the other end of the group 3'" should be connected by the wire 9"" to the last terminal contact 8''''. These may be taken as the rules for subdividing the secondary coil into groups and for connecting them up to the contacts forming the first pair or set of contacts. They are shown lying in a straight row; but this is for simplicity of illustration, as in practice the arrangement would preferably be as shown in Fig. 2. When there are three groups of coils, there are two joints, as at the ends of the wires 9" and 9'". The next point is to know the number of extra coils that should be employed. The rule is that there should be one less than the number of coils in any one of the groups. Accordingly there will be noticed the coils 11' 11" 11'". These are secondaries of the same primary coil 1; but they are not continuations of the main secondary coils 3' 3" 3'". The second set of contacts is determined by providing for each contact 8' or 8" or 8'" or 8'''' four contacts. The first four are numbered 12', 12", 12'", and 12''''. The second set is 13' 13" 13'" 13''''. The third set is 14' 14" 14'" 14''''. The fourth set is 15' 15" 15'" 15''''. The four terminals of the extra coils are connected to the four contacts of each group; but it should be noticed that the first contact 12' is connected to the last terminal of the last coil 11' and also to the terminal 10' of the instrument. More generally, the connections between the extra coils 11' 11" 11'" and the first set of contacts 12' 12" 12'" 12'''' is such that as the switch 16 moves in contact with the contact 8' and with said first set of contacts the circuit will be first a short-circuiting of the instrument with no current, then the inclusion of a single extra coil 11', then two coils 11' and 11", and then three extra coils 11', 11", and 11'", and a further movement will throw into circuit the four main coils 4', 5', 6', and 7', but before the said four coils are in circuit the switch 16 has moved to the next contact 8". By omitting the wire 17, which connects the first contact 12' to the terminal 10', the instrument need not be short-circuited at the first terminal or contact 12'.

A more general rule more easily understood now that the figures have all been referred to is that the secondary should be divided into any given number of groups with an equal number in the respective groups and that a number of extra coils should be added as secondaries, but they should not be connected directly to the said groups and only by means of a particular switch. Each group of main coils should be accompanied by one contact, necessarily made of a definite length, because each of said contacts should be accompanied by as many contacts as there are extra coils, plus one, while the number of extra coils should be one less than the number of coils in any group of main coils. The contacts for the extra coils should be connected to the same in each instance, as hereinbefore pointed out.

I claim as my invention—

1. In an electric transformer, the combination of groups of principal secondary conductors wound into equal numbers of coils and permanently connected consecutively in series circuit with one another, and having their terminals connected respectively to different contacts forming a first set of the same number as there are groups plus one, an extra secondary conductor wound into as many coils, less one, as there are in any group of principal coils, the extra coils being permanently connected consecutively in series circuit with one another, a second set of contacts formed of as many groups as there are contacts in the first set, and each group having as many contacts as there are extra coils plus one, conductors connecting the terminals of the extra coils to the contacts of each group, and a switch movable successively over and in contact with both sets of contacts for the purpose set forth.

2. The combination of electrically-separated sets of transformer-coils, concentric rows of contacts, a rotary switch for connecting the rows of contacts in a predetermined order, conductors connecting one row of contacts to the terminals of groups of coils, of the one set of coils, and other conductors connecting the other row of contacts to different coils of the other set of coils.

Signed this 9th day of September, 1898.

LOUIS M. PIGNOLET.

Witnesses:
WILLIAM J. BARKER,
J. E. COLEMAN.